United States Patent [19]

Weiner

[11] Patent Number: 4,824,375

[45] Date of Patent: Apr. 25, 1989

[54] SOUND-PRODUCING AMUSEMENT OR EDUCTIONAL APPARATUS

[75] Inventor: Avish J. Weiner, Tel-Aviv, Israel

[73] Assignee: Megatone Ltd., Tel Aviv, Israel

[21] Appl. No.: 145,160

[22] Filed: Jan. 19, 1988

Related U.S. Application Data

[60] Continuation-in-part of Ser. No. 3,040, Jan. 13, 1987, abandoned, which is a division of Ser. No. 116,842, Nov. 5, 1987, Pat. No. 4,778,391.

[30] Foreign Application Priority Data

Jan. 2, 1987 [IL]  Israel ........................................ 81146

[51] Int. Cl.$^4$ ............................................. G09B 19/00
[52] U.S. Cl. ...................................... 434/319; 381/77; 381/79; 381/81
[58] Field of Search .................... 434/319; 381/77, 79, 381/81, 82

[56] References Cited

U.S. PATENT DOCUMENTS 3,598,923 8/1971 Turner .................................. 381/79
3,688,052 8/1972 Self et al. ............................. 381/79
3,934,202 1/1976 Missale .................................. 381/77
3,960,254 6/1976 Fial et al. ............................. 434/319
4,163,123 7/1979 Brodsky et al. ....................... 381/77

Primary Examiner—Leo P. Picard
Attorney, Agent, or Firm—Benjamin J. Barish

[57] ABSTRACT

Apparatus for carrying out an amusement, educational or similar function accompanied by audible sounds relating to an article, comprises a static memory unit adapted to be located at a fixed location with respect to the article and including a read-only memory having digitally stored therein a recording of particular audible sounds relating to the article, and a portable sound-producing unit to be carried by a user for converting a digital recording stored in the read-only memory of the memory unit to audible sounds. The sound-producing unit stored the digital data from the memory unit at a rate faster than the normal speech rate, and plays it back at the normal speech rate. Examples of applications of the apparatus include museum and exhibition displays and geographical directories.

19 Claims, 6 Drawing Sheets

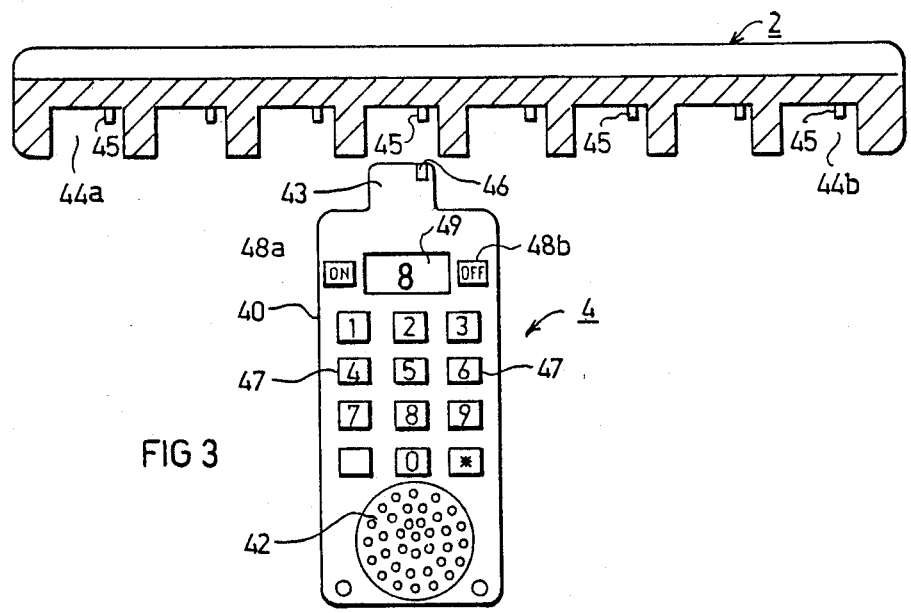
FIG 3
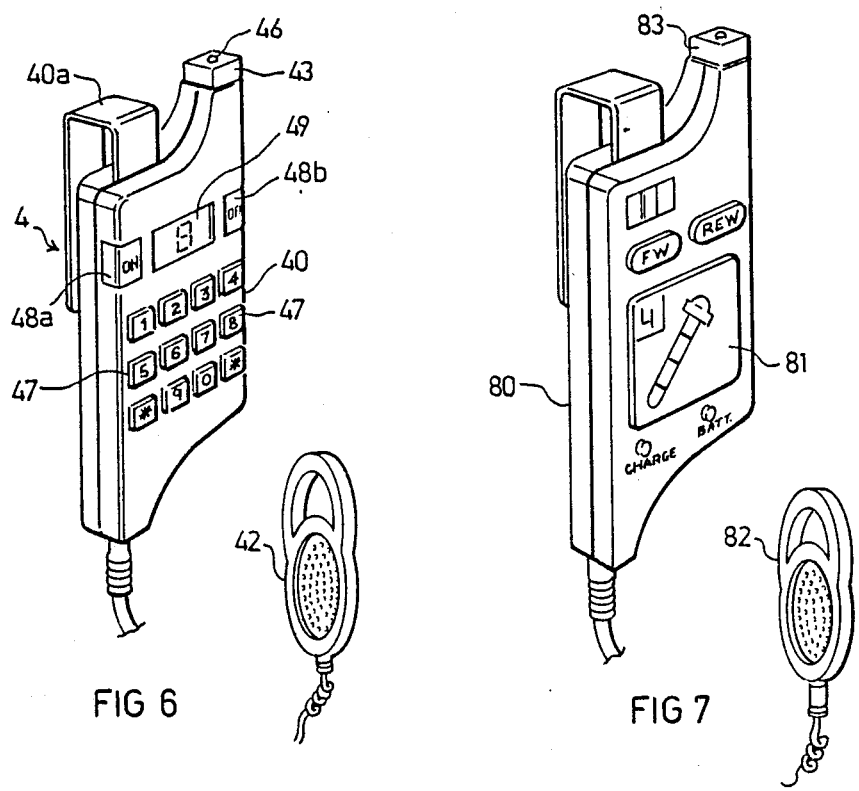
FIG 6
FIG 7

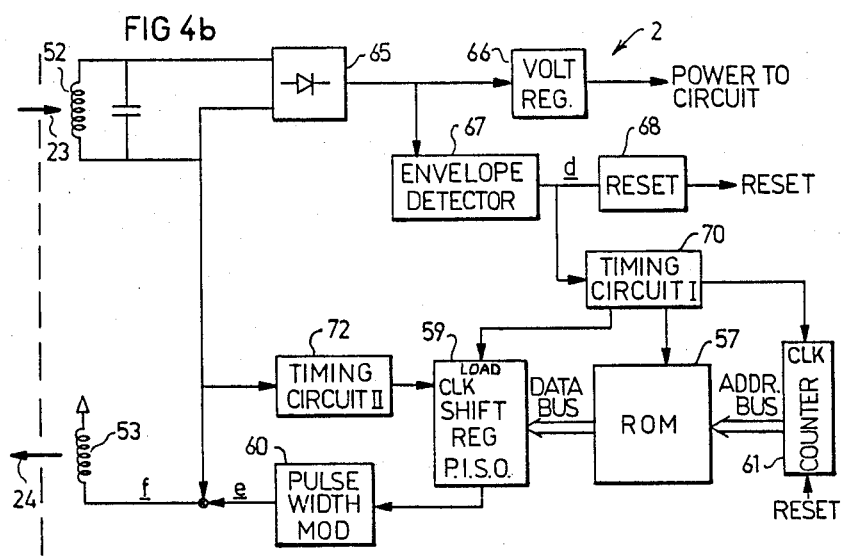
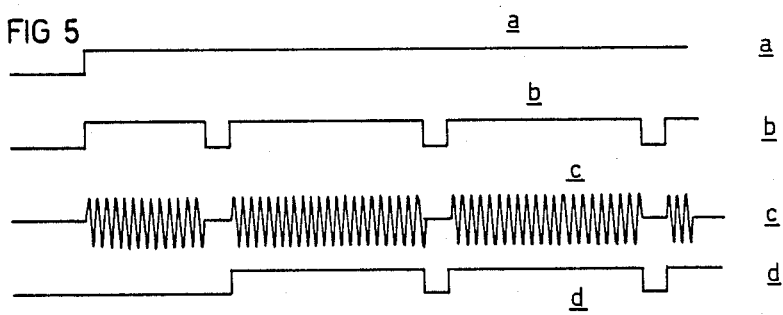
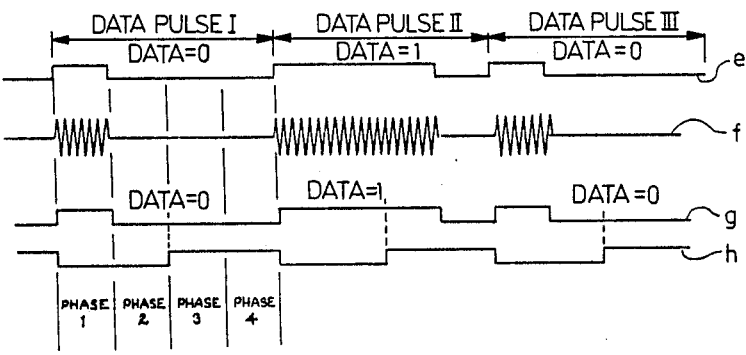

SOUND-PRODUCING AMUSEMENT OR EDUCTIONAL APPARATUS

RELATED APPLICATIONS

The present application is a continuation-in-part of my U.S. patent application Ser. No. 07/003,040 filed Jan. 13, 1987 now abandoned, and also relates to my U.S. patent application Ser. No. 07/116,842 filed Nov. 5, 1987 now U.S. Pat. No. 4,778,391 as a division of U.S. patent application Ser. No. 07/003,040.

BACKGROUND OF THE INVENTION

My U.S. patent application Ser. No. 07/003,040 describes various forms of apparatus for carrying out an amusement or educational function accompanied by audible sounds relating to an article, such as a book, toy or doll. Briefly, the described apparatus comprises a fixed memory unit to be attached to the article or at a fixed location in the vicinity thereof and including a read-only memory having digitally stored therein a recording of particular audible sounds relating to the article, and an output device. The apparatus further includes a portable sound-producing unit to be carried by a user and means to convert a digital recording stored in the read-only memory of the memory unit to audible sounds. The sound-producing unit further includes an input device which, when coupled to the output device of the memory unit, plays back the particular recording stored therein, and when coupled to the output device of another article having a different recording stored therein, plays back that recording. Thus, the same sound-producing unit is usable with a plurality of such articles having different recordings therein.

The present invention is directed to new applications of such apparatus. Illustrative examples of such new applications as described herein include museums or exhibitions displaying, different articles each described in a message recorded in the memory unit; sales, manufacturing, and maintenance demonstrations for describing an article or the manner of its manufacture or maintenance; and geographical directories, providing directions for travelling to various destinations marked thereon. Many other applications of the invention will be apparent from the description below.

BRIEF SUMMARY OF THE INVENTION

According to the present invention, there is provided apparatus for carrying out an amusement or educational function accompanied by audible sounds relating to an article, said apparatus comprising: a static memory unit adapted to be located at a fixed location with respect to the article and including a read-only memory having digitally stored therein a recording of particular audible sounds relating to the article, and an output device; and a portable sound-producing unit to be carried by a user and including an input device adapted to be coupled to the output device of the memory unit and means to convert a digital recording stored in the read-only memory of the memory unit to audible sounds; said sound-producing unit further including a random-access memory for receiving the digital data stored in said memory unit at a rate faster than the normal speech rate, and control means for playing-back the digital data or part of it received in said random-access-memory at the normal speech rate.

Several embodiments of the invention are described below for purposes of example.

In some described embodiments, the memory unit is a passive unit, not having its own power supply; both the transfer of power from the portable sound-producing unit and the transfer of data from the memory unit are effected via the output and input devices. In other described embodiments, the memory unit is an active unit, having its own power supply; only the transfer of data from the memory unit to the portable sound-producing unit is effected via the output and input devices.

Also described are arrangements wherein the output device of the static memory unit, and the input device of the portable sound-producing unit, are inductively-coupled devices, optically-coupled devices, or mechanically-coupled devices.

The invention is particularly useful for a museum or exhibition displaying a plurality of articles, the plurality of recordings stored in the read-only memory of the memory unit include a message for each of the articles. According to another feature, the memory unit may include a plurality of read-only memories each including its respective output device, each read-only memory having digitally recorded therein a recording of the same message but in a different language.

According to a further optional feature, the read-only memory unit may also have digitally stored video signals related to the article, and the sound-producing unit may include a visual display and means to display the video signals recorded in the read-only memory of the memory unit as a picture in the visual display. Such an arrangement is particularly useful in sales, manufacturing, or maintenance demonstrations, for describing an article, or the manner of its manufacture or maintenance.

A further application of the invention is described as a geographical directory, wherein the fixed memory unit includes a map having markings thereon indicating a reference location and the locations of a number of possible destinations with respect thereto, a read-only memory having digitally recorded therein a plurality of messages each providing directions for travelling from the reference location to one of said destinations; the apparatus further including selector means for selecting the recorded message for a selected destination. As described below, the selector means may be of the map or on the portable unit.

Further features and applications of the invention will be apparent from the description below.

BRIEF DESCRIPTION OF THE DRAWINGS

The invention is herein described, by way of example only, with reference to the accompanying drawings, wherein:

FIG. 3 illustrates one form of portable sound-producing unit that may be used with the static memory unit in the apparatus of FIGS. 1 and 2;

FIGS. 4a and 4b are circuit diagrams illustrating one form of apparatus that may be used in the portable and static units, respectively of the block diagram of FIG. 2;

FIG. 5 illustrates a series of signals helpful in understanding the circuit diagrams of FIGS. 4a and 4b;

FIGS. 6 and 7 pictorially illustrate two forms of portable sound-producing units which may be included in the apparatus of FIGS. 1-5;

DESCRIPTION OF PREFERRED EMBODIMENTS

Figure 1:
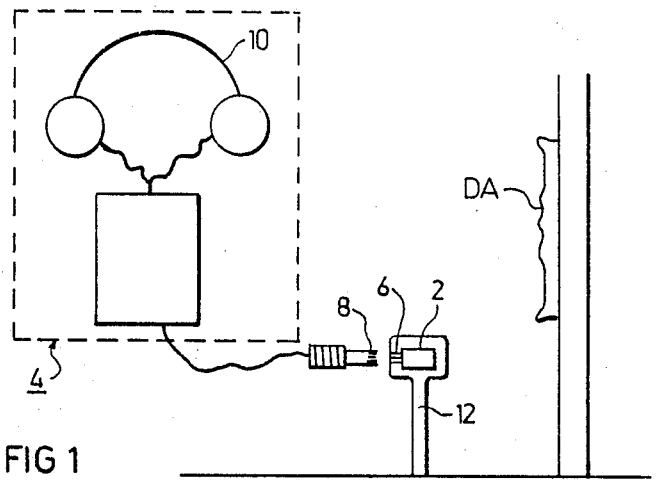
FIG. 1 illustrates an application of the invention in museums or exhibitions.

The invention is illustrated in FIG. 1 as embodied in a museum or exhibition environment wherein displayed artworks or other articles on exhibition are described by recorded audio messages to be played back to the viewer. The apparatus includes two basic units, namely: a static memory unit, generally designated 2, at a fixed location in the vicinity of the article displayed and containing a digitally-recorded message related to the article; and a portable sound-producing unit, generally designated 4, to be carried by the user and to be plugged into the static memory unit 2 for receiving the digitally-recorded message and for playing it back to the user.

The static memory unit 2 is a passive unit and does not contain its power supply; rather, it contains only the electrical components for storing the message in digital form, for receiving energy from the portable unit, and for outputting the stored message via its output device 6. The sound-producing unit 4, carried by the user, contains the power supply for both units. It also contains all the other components, including an input device 8 pluggable into the output device 6 of the memory unit 2 for receiving the recorded message and for playing it back to the user via a speaker, e.g., earphones 10.

Thus, the memory unit 2 contains a specific, digitally-recorded message related to its respective displayed article DA, while the sound-producing unit 4 is in the form of a standard device selectively pluggable into the memory unit 2 of any of the displayed articles in order to receive and play back the message for the respective article.

In the example illustrated in FIG. 1, the memory unit 2 is illustrated as being carried in a guard rail 12 or the like in front of the respective displayed article DA; however, in order to avoid congestion in front of the displays it may be preferred to locate the memory units 2 of many displays away from the displays, such as at the entrance to the room or hall where such displays are found.

Figure 2:
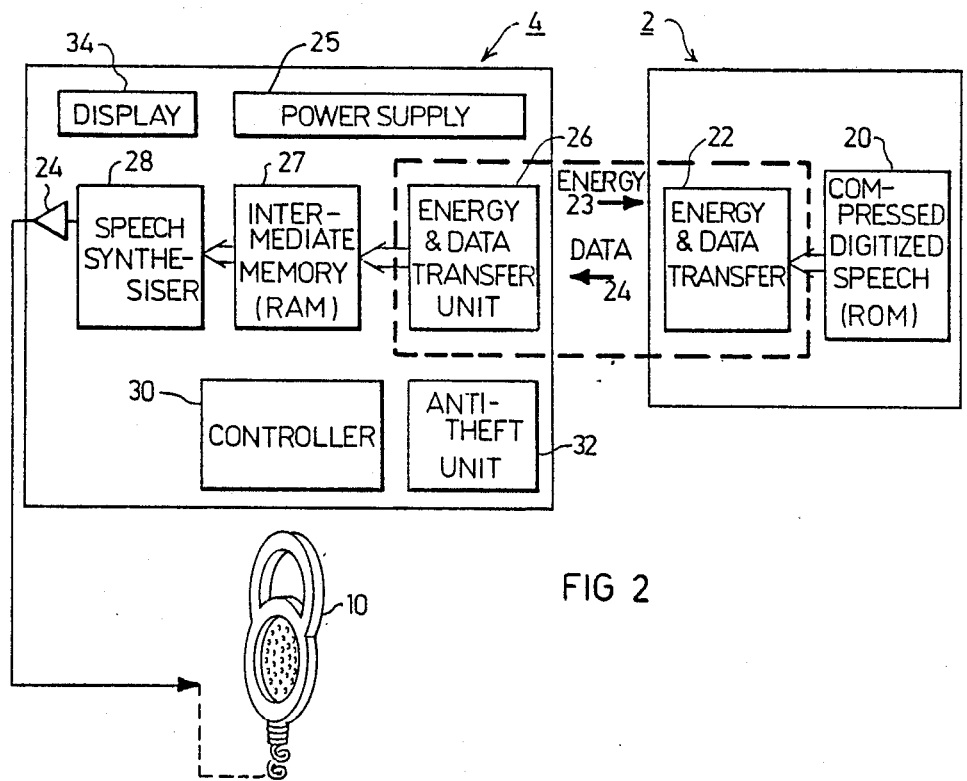
FIG. 2 is a block diagram more particularly illustrating the apparatus used in the application of FIG. 1.

FIG. 2 diagrammatically illustrates the contents of the static memory unit 2 and the portable sound-producing unit 4; FIG. 3 illustrates one example of a portable sound-producing unit which may be used; and FIG. 4 is a block diagram illustrating one example of electrical circuitry that may be used in both the static memory unit 2 and the portable sound-producing unit 4.

As shown in FIG. 2, memory unit 2 includes circuitry, generally designated 20, for storing speech in compressed digitized form, and circuitry 22 for receiving electrical energy from the sound-producing unit 4 via one path 23, and for transferring data to the sound-producing unit 4 via a second path 24. The portable sound-producing unit 4 carried by the user includes a power supply 25, such as batteries, and a circuit, generally designated 26, for transferring energy from its power supply to the memory unit 2 via path 23, and also for receiving data from the memory unit via path 24. Sound-producing unit 4 further includes an intermediate memory 27 for storing the digital data received from memory unit 2 via data transfer path 24, and further circuitry 28 for synthesizing the speech signals in order to play-back the message via an amplifier 29 and the speaker 10 carried by or attached to the sound-producing unit. All the foregoing operations are under the control of a controller, generally designated 30.

The storage device included within circuitry 20 of memory unit 2 is a read-only memory (ROM), since the message is a fixed one for the particular article displayed. On the other hand, the storage device within the intermediate memory 27 of the sound-producing unit 4 is a random-access memory (RAM), since the information recorded therein changes with each new use of the sound-producing unit. Controller 30 controls the sound-producing unit 4 so as to transfer the information from the ROM of circuitry 20 in the memory unit 2 at a fast rate, much faster than the normal speech rate, and controls the intermediate memory circuitry 27 of the sound-producing unit 4 to play-back this information at the normal speech rate.

If the sound-producing unit 4 to be carried by the user is rented out, rather than owned by the user, this unit preferably would also include an anti-theft device, generally designated 32, such as a resonant body, which would actuate a signal or alarm if carried through a detector to prevent the theft of such units. Unit 4 may also include a display 34 for displaying certain information as described below particularly with reference to FIG. 7.

FIG. 3 illustrates one example of a portable sound-producing unit 4 which may be used in the system of FIGS. 1 and 2. Thus, unit 4 includes a housing 40 containing a speaker 42 to be applied over the user's ear for hearing the played-back messages. Unit 4 further includes a plug 43 corresponding to input device 8 in FIG. 1, for plugging into any one of a plurality of output sockets 44a–44h of the memory unit, corresponding to output device 6 in the static memory unit 2 of FIG. 1. In this example, memory unit 2 includes a plurality of ROM's, each containing a different stored message, and each provided with a separate output socket 44a–44h. In the illustrated example, the ROM's for these output devices may store the same message but in different languages, each language identified by a legend over the respective plug 44a–44h and selected by the user by inserting plug 43 of the portable unit 4 into the respective plug 44a–44h.

Each of the sockets 44a–44h includes a pin 45 engageable with a reset switch 46 carried by plug 43 of the portable unit 4 to automatically initialize the energy and data transfer process of the portable unit 4. Thus, immediately upon inserting plug 43 of the portable unit 4 into one of the sockets 44a–44h, the portable unit is initialized, and the message stored in the ROM of the static unit 2 is immediately transferred to the RAM of the portable unit 4, corresponding to the socket into which the portable unit is plugged.

In the example described herein, each ROM, for each plug 44a–44h, contains a plurality of messages for a plurality of displayed articles, e.g., a plurality of artworks occupying a common room or a common hall and each identified by a different number. In this example, the messages for all the displayed articles would be simultaneously loaded into the portable unit 4, in the language selected by the user by plugging into the respective plug 44a–44h; and then the user, at his convenience, subsequently selects each message to be played back by depressing the appropriate message-selector key or keys 47 provided in the portable unit 4.

Portable unit 4 illustrated in FIG. 3 further includes an On-switch 48a, an Off-switch 48b, and an indicator 49 for displaying the number of the message-selector key or keys 47 depressed.

Figure 4A:
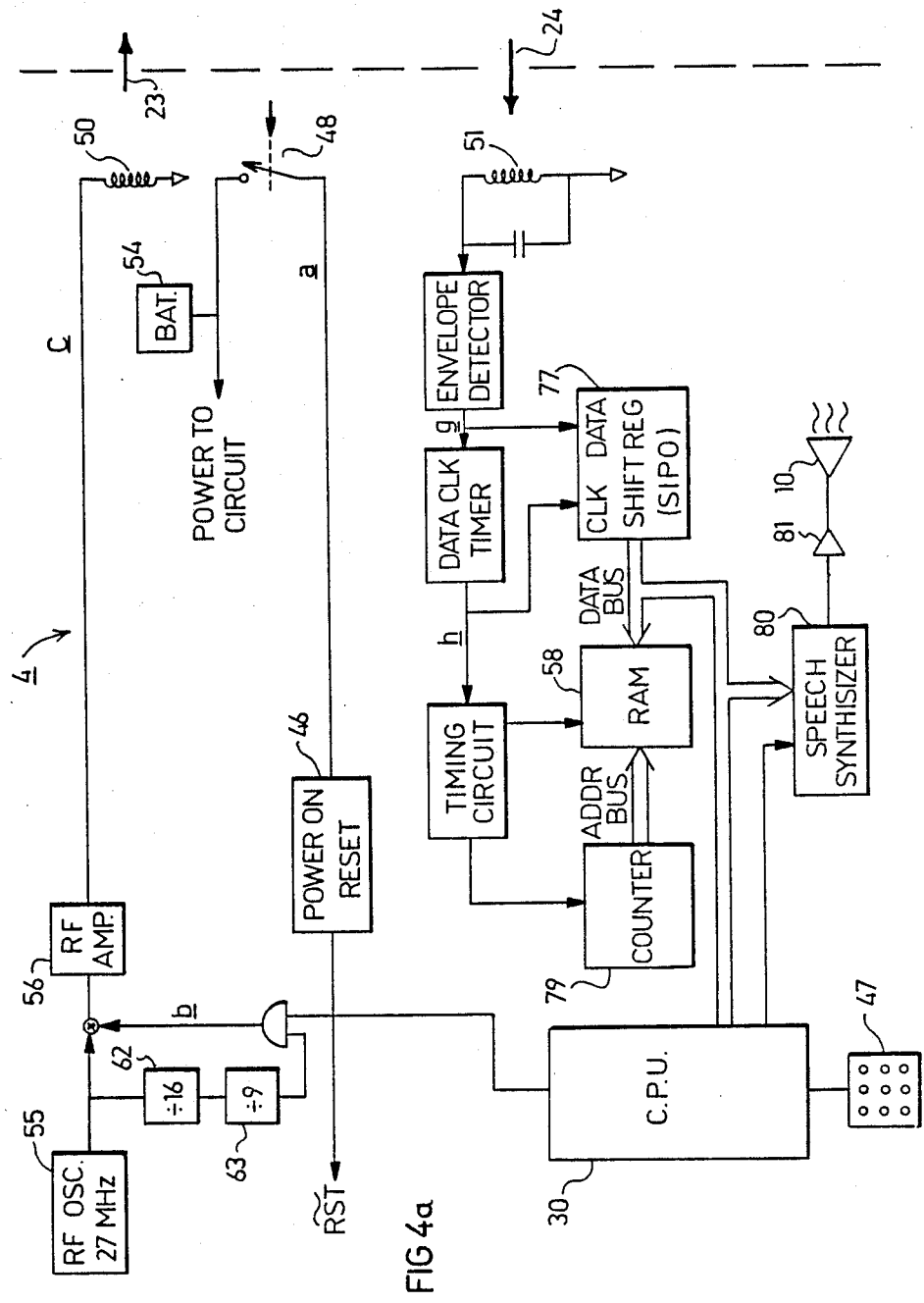

FIGS. 4a and 4b illustrate one circuit implementation of the apparatus of FIG. 2 including the portable sound-producing unit 4 of FIG. 3. In this implementation, the memory unit 2 is a passive unit; also, the sockets 44a–44h outputting the information from the memory unit 2, and the plug 43 for inputting this information into the portable sound-producing unit 4, are inductively-coupled devices performing the functions of transferring energy from unit 4 to unit 2 via path 23 (FIG. 2), and also for transferring data from unit 2 to unit 4 via path 24.

FIG. 4a illustrates the circuit of the portable sound-producing unit 4, and FIG. 4b illustrates the circuit of the static memory unit 2.

Thus, as shown in FIGS. 4a and 4b, the portable sound-producing unit 4 includes two coils 50, 51, both incorporated in its plug 43; and the memory unit 2 also includes two coils 52, 53, both incorporated in each of its sockets 44a–44h. When plug 43 is inserted into one of the sockets 44a–44h, high-frequency energy from the power supply 54 of the portable unit 4 is transferred via coils 50 and 52, constituting energy-transfer path 23 in FIG. 2, to the memory unit 2; and the data from the memory unit is transferred via coils 53 and 51, constituting the data-transfer path 24 in FIG. 2, to the portable sound-producing unit 4. This inductively-coupled arrangement obviates the need for direct mechanical contact between plug 43 and the sockets 44a–44h, and thereby reduces the possibility of malfunction because of defective contact, as well as reduces the need for maintaining good electrical contact between the plug and socket. It will be appreciated that a single coil on each unit may be used for effecting both energy and data transfer.

The power supply, battery 54, in the portable sound-producing unit 4 supplies power to that unit and also to the passive memory unit 2 under the control of the On-Off keys 48a, 48b, schematically indicated together at 48 in FIG. 4, and the Reset switch 46. An RF oscillator 55 supplies the power via an amplifier 56 to coil 50 of the portable unit 4 in the energy transfer path 23 to the static memory unit 2.

The data transfer path 24 transfers the data stored in ROM 57 of the static memory unit 2 to the RAM 58 of the portable unit 4. Both memories 57 and 58 are organized according to bytes, each including eight bits. Memory unit 2 further includes a shift register 59 which receives the data from ROM 57 in a parallel manner, and shifts it out serially via a pulse width modulator 60 and coils 53, 51, to the RAM 58 in the portable unit 4. This is done by providing each frame with nine time slots: eight are for data bits, and one is for sync. During each of the first eight time slots, one bit is sent out from the static unit 2 to the portable unit 4. During the ninth time slot, a counter 61 in the memory unit 2, connected to the address bus of the ROM 57, is incremented, and the contents of ROM 57 are read out to the shift register 59.

More particularly, the system illustrated in FIGS. 4a and 4b operates as follows:

Upon the insertion of plug 43 of the portable unit 4 into one of the sockets 44a–44h of the static memory unit 2, reset switch 46 in the plug is actuated by pin 45 in the respective socket. This produces the reset signal a (FIG. 5) which starts the down-loading process for loading RAM 58 in the portable unit 4 with the contents of the ROM 57 in the static unit 2.

The 27 MHz output of oscillator 55 is divided by 16 in circuit 62 and then by 9 in circuit 63. The output of these two divider circuits is applied to gate 64, enabled by the reset signal a to produced signal b (FIG. 5). The first eight time slots in signal b are "high" to transfer eight bits from ROM 57 of the static unit 2 to RAM 58 of the portable unit 4; the ninth time slot is "low" for synchronization.

Signal b, added to the RF carrier signal from oscillator 55, is applied to amplifier 56 which produces the output signal c (FIG. 5). Signal v is transferred to coil 50 of the portable unit 4.

As shown by the energy transfer path 23 in FIG. 4, signal c is transferred to coil 52 of the static unit 2. This signal, after rectification by full-wave rectifier 65 and regulation by regulator 66, is used to power the circuit in the static unit 2.

Signal c from coil 52 is also used for transferring the data from ROM 57 of the static unit 2 to RAM 58 of the portable unit 4 via data transfer path 24 in the following manner.

The signal c picked up by coil 52, after rectification in rectifier 65, is applied to envelope detector 67 producing signal d, and then to reset circuit 68 to produce the reset signal to counter 61. Signal d from envelope detector 67 is also applied to timing circuit 70, which produces the appropriate pulses for controlling the timing of counter 61, ROM 57 and shift register 59. As indicated earlier, counter 61 is connected to the address bus of ROM 57.

Counter 61 is loaded with O's when receiving the Reset Pulse, and is incremented by "1" whenever a sync time slot (the ninth time slot) of the frame is detected. ROM 57 is organized in bytes of eight bits, and is activated during the sync (ninth) time slot.

After each new address is ready from the counter 61, the contents of this address of the ROM 57 are read into shift register 59. As described earlier, shift register 59 has parallel inputs (therefore eight input lines) and a serial output (one output line). Thus, each address in the ROM 57 is transferred into the shift register 59 during the ninth time slot of the respective frame, and is read out of the shift register during the eight first time slots of the next frame as controlled by timing circuit 72, which produces a clock pulse to the shift register. The contents of the shift register are thus outputted serially to the pulse width modular 60, also controlled by timing circuit 72, to produced signal e.

FIG. 5 illustrates signals e, f, g and h as appearing in three of the time slots, each composed of four phases. The first phase is always "1"; the last phase is always "0"; and the levels of the second and third phases depend on the data value. Thus, both of the second and third phases are "0" to represent "0", and both are "1" to represent "1".

Thus, signal e illustrated in FIG. 5 shows three time slots representing the values "0, 1, 0".

Signal e is modulated by the high frequency from coil 52 to produce signal f (FIG. 5), which latter signal is transmitted via coil 53 of the static unit 2 to coil 51 of the portable unit 4 in data transfer path 24.

In the portable unit 4, envelope detector 75 removes the high-frequency carrier from the data signal, leaving only the data signal as shown by signal g; the latter signal is the same as the previously-mentioned signal e, plus the small propagation delay time ($\Delta t$). The latter signal is applied to data clock timer 76 which produces signal h. As shown in FIG. 5, signal h is a square way of four phases: phases PH-1 and PH-2 are always "0", and phases PH-3 and PH-4 are always "1". Shift register 77 samples the value of signal g at its middle point, i.e., when signal h goes from "0" to "1". If signal g is "0" at this point, the data represented is "0"; and if it is "1" at this point, the data represented is "1".

Shift register 77 has a serial input and parallel outputs. Signal g is always connected to the serial input, and the input is latched only at the mid-point of signal g i.e., when signal h goes from "0" to "1".

Signal h is divided by "8" to produce a WRITE pulse to RAM 58 when a new byte is ready for "writing" into the RAM. Thus, the RAM 58 of the portable unit 4 is loaded with the contents of the ROM 57 of the static unit 2 during the ninth time slot of each frame, when the sync pulse is produced.

The above-described down-loading of the contents of the ROM 57 of the static unit 2 into the RAM 58 of the portable unit 4 is controlled by the CPU 30 in the portable unit 4, and the down-loading process is completed when counter 79 in the portable unit reaches the highest address.

The play-back of the information down-loaded into RAM 58 is controlled by the keyboard 47 via CPU 30. This information is fed to the speech synthesizer 80 in the portable unit 4 under the control of CPU 30 and is amplified by amplifier 81 before being converted to sound in the speaker 10.

As described earlier, the data is transferred from ROM 57 of the memory unit 2 to RAM 58 of the portable unit 4 at a high rate, much higher than the normal speech rate, and is reproduced in the portable unit 4 at the normal speech rate. This is controlled by CPU 30. As one example, 1.5 minutes of speech may be compressed into one megabit of memory within ROM 57 of the memory unit 2, and maybe transferred to RAM 58 of the portable unit 4 in about 1.0 seconds; such data may then, or at any subsequent time, be reproduced by unit 4 at the normal speech rate of 1.5 minutes.

FIG. 6 is a pictorial illustration of one form of portable sound-producing unit 4 which may be used in the above-described system. Its various elements are identified by the same reference numerals as illustrated in FIG. 3. To facilitate portability, its housing 40 is provided with a clip 40a which may be clipped to a pocket or belt of the user.

FIG. 7 pictorially illustrates another form of portable sound-producing unit which may be used, particularly in applications for demonstrating a product, or the manner of manufacturing, operating or maintaining the product. In this type of application, it is desirable to record in the memory unit (corresponding to unit 2 above) not only audio signals relating to the respective article, but also video signals illustrating the respective article or some aspect involved in its manufacture, operation or maintenance. In such an application, the circuit 20 in FIG. 2 would also include digitized video information in compressed form, which video information would be transferred via the data transfer path 24 to the intermediate memory 27 of the portable unit 4 and synthesized in circuit 28 in the form of pictures to be displayed in a display.

Thus, as shown in FIG. 7, the portable unit 80 includes a screen 81, e.g., an LCD (liquid crystal display) for displaying the synthesized video information, as well as a speaker 82 for reproducing the synthesized audio information. The portable unit illustrated in FIG. 7 further includes a plug 83, corresponding to plug 43 in FIG. 6, for plugging into a socket of the memory unit, but does not include the keys 47 to enable selection of any one of a plurality of messages that may be transmitted by the memory unit to the portable unit.

Figure 8:
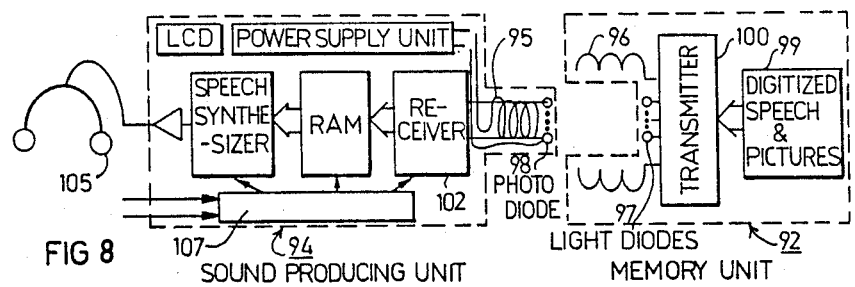
FIG. 8 is a block diagram illustrating the apparatus including an optical coupling between the static and portable units for transferring data, and an inductive coupling for transferring energy.

FIG. 8 illustrates another implementation, also contactless as in FIGS. 4 and 5, for transmitting both the energy from the portable sound-producing unit 94 to the memory unit 92 via the energy transfer path (23, FIG. 2), and also for transmitting data from the memory unit 92 to the sound-producing unit 94 via the data transfer path (24, FIG. 2). As in the embodiments of FIGS. 4 and 5, the energy transfer path includes inductively-coupled coils 95 and 96 in the two units 94 and 92, respectively, but the data transfer path includes optically-coupled devices. For example, the sockets (e.g., 44a–44h, FIG. 3) of the memory unit may include infrared light devices 97, and the plug (e.g., 43 in the portable unit 4) may include photodiodes 98 for receiving the data transferred thereto by the light devices 97.

The apparatus schematically illustrated in FIG. 8 is otherwise substantially the same as described above with respect to FIGS. 4 and 5. Thus, its static memory unit 92 includes a ROM 99 for storing the audio (and video) information in compressed digitized form, and a transmitter circuit 100 for reading-out this information in digitized form to the optical devices 97; whereas the portable sound-producing unit 94 includes the power supply 101 for powering that unit as well as the memory unit 92 via the inductively-coupled coils 96. Unit 94 further includes a receiver 102 for receiving and storing the data transferred via optical devices 97 and 98 in a RAM 103 at a high rate, and a synthesizer 104 for synthesizing the audio signals into speech at the normal speech rate for play-back via speaker 105, and for synthesizing the video signals for display in the LCD 106, all under the control of a controller 107.

Figure 9:
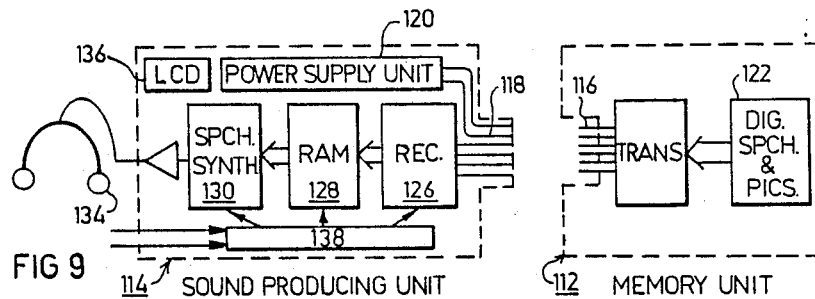
FIG. 9 is a block diagram illustrating the apparatus including a mechanical coupling between the two units.

FIG. 9 illustrates another implementation of the invention by the use of a conventional mechanical connector for coupling the memory unit 112 to the portable sound-producing unit 114. In this case, the memory unit 112 includes a multiple-contact socket 116, and the portable sound-producing unit 114 includes a multiple-contact plug 118 engageable with the contacts of socket 116 for transferring both energy from the power supply 120 to the memory unit 112, and also for transferring the audio and video information stored in its ROM 122 in compressed digitized form to the portable unit 114 via a transfer circuit 124. The digitized data is received in a receiver circuit 126 in the portable unit 114, stored at a fast rate in its RAM 128, and reproduced at the normal speech rate via synthesizer 130 in speaker 134 and display 136, under the control of processor 138.

Figure 10:
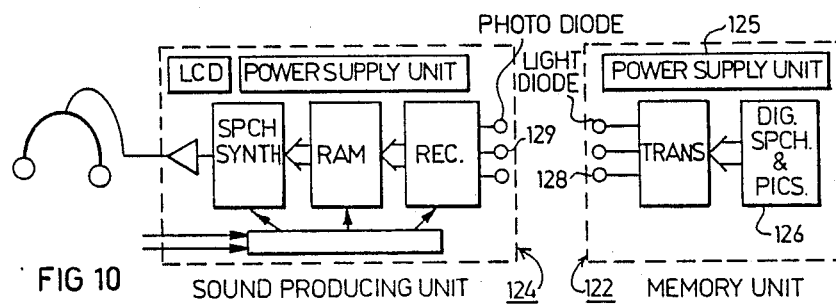
FIG. 10 is a block diagram illustrating a variation wherein the memory unit is an active unit and is optically coupled to the portable sound-producing unit.
Figure 11:
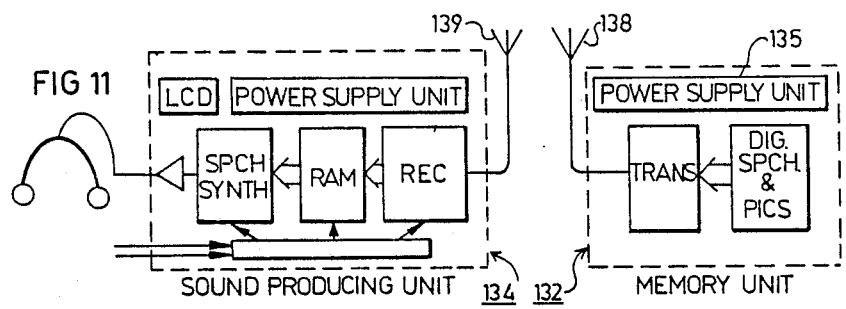
FIG. 11 is a block diagram illustrating a further variation wherein the memory unit is also an active unit but is coupled to the portable sound-producing unit by a radio-frequency coupling.

In the above-described embodiments of the invention, the memory unit was a passive unit; that is, it does not include a power supply, but rather receives its power from the portable unit via the energy transfer path (23, FIG. 2). FIGS. 10 and 11 illustrate two further embodiments wherein the memory unit is an active unit, including its own power supply, but also including a data transfer path (corresponding to path 24, FIG. 2) for transferring its stored data to the portable unit.

Thus, FIG. 10 is similar to the arrangement illustrated in FIG. 8, except that it includes its own power supply 125, and therefore there is no need for coils 95 and 96 for transferring energy from the portable unit 124 to the memory unit 122. In substantially all other respects, the arrangement illustrated in FIG. 10 is similar to that of FIG. 8: it includes a ROM 126 for storing the digitized speech and video signals, and a transmitter circuit 127 for transmitting the information via light sources 128 to the photodetectors 129 of the portable unit 124.

The arrangement illustrated in FIG. 11 also includes an active memory unit, therein designated 132, including its own power supply 135. In the arrangement in FIG. 11, however, the data transfer path (corresponding to path 24 in FIG. 1) includes a transmitting antenna 138 on the memory unit 132, and a receiving antenna 139 on the portable unit 134. This arrangement thus obviates the need for providing a plug in the portable unit and a socket in the memory unit for transmitting the data from the memory unit to the portable unit.

Figure 12:
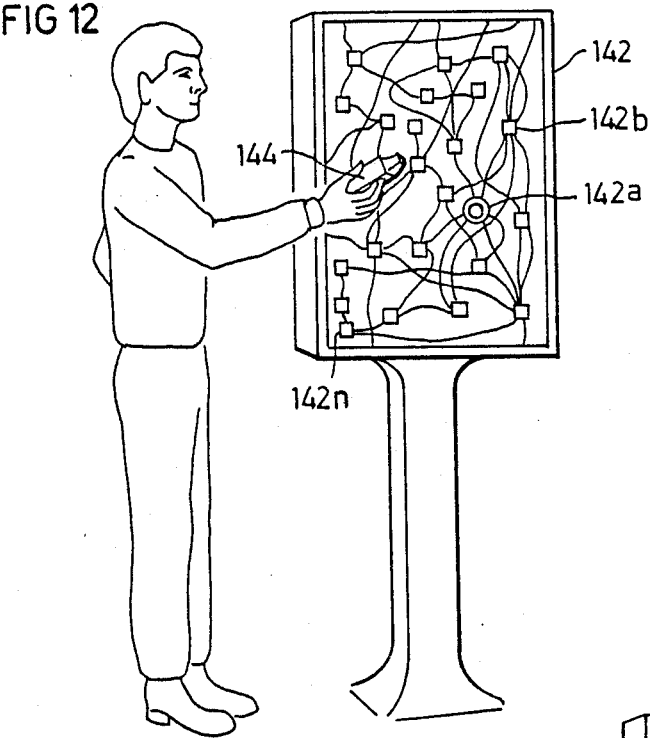
FIG. 12 diagrammatically illustrates the invention embodied in a geographical directory for providing directions to travellers from one location to another.

FIG. 12 illustrates the invention embodied in a graphical directory, in which the static memory unit, generally designed 142, includes a map having markings thereon indicating a reference location 142a, namely the location of the map and thereby of the person seeking information from it. The map markings also include a number of other locations 142b–42n, namely the ultimate destinations of persons consulting the map. Each of these destinations 142b–142n is provided with a socket connected to a ROM having digitally recorded therein a message providing directions for travelling from the reference location (that of the map) to the respective destination. Thus, a person equipped with a portable sound-reproducing unit 144 may plug it into the appropriate socket 142b–142n according to the desired destination of the user, and would thereby receive a message providing directions for travelling from the location of the map to the desired destination.

Figure 13:
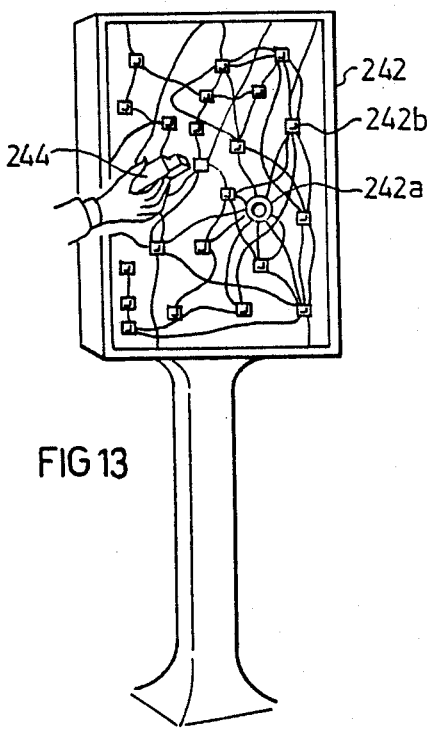
FIGS. 13 and 14 illustrate two variations in the geographical directory of FIG. 12.
Figure 14:
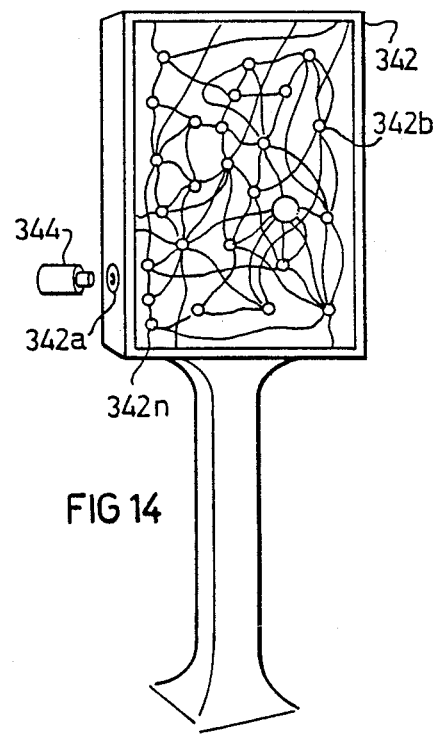

It will thus be seen that in FIG. 12, the selector means for selecting the recorded message for a particular destination is effected by providing a plurality of sockets on the map each located at one of the destinations and each effective to select the recorded message for the respective destination. FIGS. 13 and 14 illustrate other variations that may be used.

Thus, in FIG. 13, the selector means comprises a plurality of manually-operated switches, in the form of depressable keys 242b–242n, each located at one of the destinations of the map 242, and each effective to select the recorded message for the respective destination from the reference location 242a, which is provided with a socket, as in FIG. 12, for receiving the plug end of the portable unit 244.

FIG. 14 illustrates a still further variation wherein the socket, therein designated 342a, for receiving the plug of the portable unit 344 is not necessarily at the reference location, but rather is in the side of the map unit 342, which map unit is merely provided with conventional markings 342b–342n illustrating various destinations from the reference location 342a. Selection of the recorded message for a selected destination is effected by the manually-operated switches (e.g., 47, FIG. 6) of the portable unit itself, which specify the stored message, corresponding to the selected destination, to be read-out to the portable unit.

In all the illustrated embodiments, the memory unit is described as including one or more read-only memories (ROM); it will be understood that this includes the variations of such memories, namely PROM's, EPROM's, EEPROM's, etc.

While the invention has been described with respect to several preferred embodiments, it will be appreciated that many other variations, modifications and applications of the invention will be apparent.

What is claimed is:

1. Apparatus for carrying out an amusement, educational or similar function accompanied by audible sounds relating to an article, said apparatus comprising:
    a static memory unit adapted to be located at a fixed location with respect to said article and including a read-only memory having digitally stored therein a recording of particular audible sounds relating to the article, and an output device;
    and a portable sound-producing unit to be carried by a user and including an input device adapted to be coupled to the output device of the static memory unit and means to convert a digital recording stored in the read-only memory of the static memory unit to audible sounds;
    said sound-producing unit further including a random-access memory for storing the digital data stored in said static memory unit at a rate faster than the normal speech rate, and control means for subsequently playing-back the digital data recorded in said random-access-memory at the normal speech rate.

2. The apparatus according to claim 1, wherein said static memory unit is a passive unit, not having its own power supply, both the transfer of power from the portable sound-producing unit and the transfer of data from the static memory unit being effected via said output and input devices.

3. The apparatus according to claim 1, wherein said memory unit is an active unit, having its own power supply, only the transfer of data from the static memory unit to the portable sound-producing unit being effected via said output and input devices.

4. The apparatus according to claim 1, wherein said output device of the static emory unit, and said input device of the sound-producing unit, include inductively-coupled devices.

5. The apparatus according to claim 1, wherein said output device of the static memory unit, and said input device of the sound-producing unit, include optically-coupled devices.

6. The apparatus according to claim 1, wherein said output device of the static memory unit, and said input device of the sound-producing unit, include mechanically-coupled devices.

7. The apparatus according to claim 1, wherein said output device in the static memory unit includes a socket, and the input device in the portable sound-producing unit includes a plug receivable in said socket.

8. The apparatus according to claim 7, wherein said plug includes a reset switch automatically actuated by insertion of the plug into the output device socket to initialize the data transfer.

9. The apparatus according to Claim 1, wherein said read-only memory of the static memory unit has digitally stored therein a plurality of recordings, and said control means in the sound- producing unit includes a manual selector for selecting the recording to be played back.

10. The apparatus according to claim 9, particularly useful for a museum or exhibition displaying a plurality of articles, the plurality of recordings stored in said read-only memory of the static memory unit including a message for each of said articles.

11. The apparatus according to claim 10, wherein said static memory unit includes a plurality of read-only memories each including its respective output device, each read-only memory having digitally recorded therein a recording of the same message but in a different language.

12. The apparatus according to claim 1, wherein said static unit includes a plurality of read-only memories each including its respective output device, there being a separate read- only memory and a separate output device for each of said articles.

13. The apparatus according to claim 1, wherein said read-only memory of the static memory unit also has digitally stored therein a recording of video signals related to said article; said sound-producing unit including a visual display, and means to convert the video signals recorded in said read-only memory of the static memory unit to a picture displayed in said visual display.

14. The apparatus according to claim 1, particularly useful as a geographical directory, wherein said fixed static memory unit includes a map having markings thereon indicating a reference location and the locations of a number of possible destinations with respect thereto, and a read-only memory having digitally recorded therein a plurality of messages each providing directions for travelling from said reference location to one of said destinations; said apparatus further including selector means for selecting the recorded message for a selected destination.

15. The apparatus according to claim 14, wherein said selector means comprises a plurality of sockets on said map each located at one of said destinations, and each effective to select the recorded message for the respective destination.

16. The apparatus according to claim 14, wherein said selector means comprises a plurality of manually-operated switches on said map each located at one of said destinations and each effective to select the recorded message for the respective destination.

17. The apparatus according to claim 14, wherein said selector means comprises a plurality of manually-operated switches on said portable unit effective to select the recorded message, for a selected destination on the map, to be read out from the fixed static memory unit to the portable unit.

18. Apparatus for carrying out an amusement, educational or similar function accompanied by audible sounds relating to an article, said apparatus comprising:
a static memory unit adapted to be located at a fixed location with respect to said article and including a read-only memory having digitally stored therein a recording of particular audible sounds relating to the article, and an output device comprising a socket;
and a portable sound-producing unit to be carried by a user and including an input device comprising a plug adapted to be inserted into the socket of the static memory unit and means to convert a digital recording stored in the read-only memory of the static memory unit to audible sounds;
said plug including a reset switch automatically actuated by insertion of the plug into said socket of the static memory unit initialize the data transfer.

19. The apparatus according to claim 18, wherein said sound-producing unit further includes a random-across memory for storing the digital data stored in said static memory unit at a rate faster than the normal speech rate, and control means for subsequently playing-back the digital data recorded in said random-access-memory at the normal speech rate.

* * * * *